US012559023B2

(12) United States Patent
Sharma et al.

(10) Patent No.: US 12,559,023 B2
(45) Date of Patent: Feb. 24, 2026

(54) SITUATIONAL EXTERNAL DISPLAY

(71) Applicant: GM Global Technology Operations LLC, Detroit, MI (US)

(72) Inventors: Manoj Kumar Sharma, Troy, MI (US); Akilesh Rajavenkatanarayanan, Macomb, MI (US); Joseph F. Szczerba, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 324 days.

(21) Appl. No.: 18/487,598

(22) Filed: Oct. 16, 2023

(65) Prior Publication Data

US 2025/0121768 A1 Apr. 17, 2025

(51) Int. Cl.
B60Q 1/50 (2006.01)
G06V 20/56 (2022.01)

(52) U.S. Cl.
CPC ........... B60Q 1/5037 (2022.05); B60Q 1/543 (2022.05); G06V 20/56 (2022.01)

(58) Field of Classification Search
CPC .... B60Q 1/5037; B60Q 1/543; B60Q 1/5035; B60Q 2800/10; B60Q 2900/30; G06V 20/56; B60W 40/02; G06N 20/00
See application file for complete search history.

(56) References Cited

U.S. PATENT DOCUMENTS

| 11,922,787 | B1* | 3/2024 | Barcia | G08B 21/043 |
| 2019/0137290 | A1* | 5/2019 | Levy | B60Q 1/507 |
| 2022/0179432 | A1* | 6/2022 | Nojoumian | B60N 2/28 |
| 2023/0249614 | A1* | 8/2023 | Kim | B60Q 1/535 |
| | | | | 340/468 |
| 2023/0368663 | A1* | 11/2023 | Puchalski | B60Q 1/535 |
| 2024/0157871 | A1* | 5/2024 | Weston | B60Q 1/44 |

* cited by examiner

*Primary Examiner* — Omeed Alizada
(74) *Attorney, Agent, or Firm* — Vivacqua Crane, PLLC

(57) ABSTRACT

A system for providing a message on an external display of a vehicle includes a plurality of onboard sensors adapted to collect data related to an environment surrounding the vehicle and objects within the environment surrounding the vehicle, a system controller, in communication with the plurality of onboard sensors, and adapted to receive, from the plurality of onboard sensors, data related to the environment surrounding the vehicle and objects within the environment surrounding the vehicle and identify current situational characteristics of the vehicle that require explanation to third parties within the environment surrounding the vehicle, and an external display in communication with the system controller, the system controller further adapted to display, via the external display, an explanation message related to the current situational characteristics of the vehicle for third parties within the environment surrounding the vehicle.

20 Claims, 6 Drawing Sheets

11

SLOW MOVING
VEHICLE AHEAD

52

MAIL PICKUP 2:00 MIN

50

62

10

52

FLAT TIRE 50,60

10

SITUATIONAL EXTERNAL DISPLAY

INTRODUCTION

The present disclosure relates to a system and method for providing information about a vehicles condition or actions to entities outside of the vehicle.

Vehicles are equipped with many sensors to monitor situational characteristics of a vehicle and the environment surrounding the vehicle. Current systems do not use such data to determine when an explanation of the vehicle's situational characteristics may be appropriate for entities outside of the vehicle, and provide an explanation message to such entities via an external human machine interface.

Thus, while current systems and methods achieve their intended purpose, there is a need for a new and improved system and method for providing an explanation message to entities outside of a vehicle to provide such entities with information about situational characteristics of the vehicle.

SUMMARY

According to several aspects of the present disclosure, a method of providing a message on an external display of a vehicle includes collecting, with a plurality of onboard sensors, data related to an environment surrounding the vehicle and objects within the environment surrounding the vehicle, receiving, with a system controller in communication with the plurality of onboard sensors, data related to the environment surrounding the vehicle and objects within the environment surrounding the vehicle, identifying, with the system controller, current situational characteristics of the vehicle that require explanation to third parties within the environment surrounding the vehicle, and displaying, with an external display, an explanation message related to the current situational characteristics of the vehicle for third parties within the environment surrounding the vehicle.

According to another aspect, the identifying, with the system controller, current situational characteristics of the vehicle that require explanation to third parties within the environment surrounding the vehicle further includes receiving, via a human machine interface (HMI), a manually created explanation message from an occupant of the vehicle.

According to another aspect, the identifying, with the system controller, current situational characteristics of the vehicle that require explanation to third parties within the environment surrounding the vehicle further includes identifying, with a computer vision algorithm, actions taken by third parties within the environment surrounding the vehicle, and determining, with a machine learning algorithm, that identified actions taken by third parties within the environment surrounding the vehicle indicate that current situational characteristics of the vehicle require explanation to such third parties within the environment surrounding the vehicle.

According to another aspect, the identifying, with the system controller, current situational characteristics of the vehicle that require explanation to third parties within the environment surrounding the vehicle further includes identifying, with a computer vision algorithm, a location and activity of the vehicle, and determining, with the machine learning algorithm, that the location and activity of the vehicle require explanation to third parties within the environment surrounding the vehicle.

According to another aspect, the identifying, with the system controller, current situational characteristics of the vehicle that require explanation to third parties within the environment surrounding the vehicle further includes receiving, with the system controller in communication with at least one physiological sensor associated with an occupant within the vehicle, data related to a medical condition of the occupant, and identifying, with the system controller, a medical emergency situation.

According to another aspect, the identifying, with the system controller, current situational characteristics of the vehicle that require explanation to third parties within the environment surrounding the vehicle further includes analyzing real-time data collected by the plurality of onboard sensors with a computer vision algorithm and a machine learning algorithm within the system controller and in communication with a database adapted to store data of past occurrences, calculating, with the machine learning algorithm, a probability that current situational characteristics of the vehicle require explanation to third parties within the environment surrounding the vehicle, and determining that an explanation is required when the calculated probability exceeds a pre-determined threshold.

According to another aspect, the displaying, with an external display, an explanation message related to the current situational characteristics of the vehicle for third parties within the environment surrounding the vehicle further includes one of automatically displaying, with the external display, the explanation message, or prompting, via a human machine interface (HMI), an occupant of the vehicle with the explanation message and displaying, with the external display, the explanation message upon receiving confirmation from the occupant of the vehicle via the HMI.

According to another aspect, the method further includes, after identifying, with the system controller, current situational characteristics of the vehicle that require explanation to third parties within the environment surrounding the vehicle, determining, with the machine learning algorithm and a graphical image generator, content of the explanation message.

According to another aspect, the determining, with the machine learning algorithm and a graphical image generator, content of the explanation message further includes calculating, with the machine learning algorithm, an estimated time that current situational characteristics of the vehicle will continue and including the estimated time within the explanation message.

According to several aspects of the present disclosure, a system for providing a message on an external display of a vehicle includes a plurality of onboard sensors adapted to collect data related to an environment surrounding the vehicle and objects within the environment surrounding the vehicle, a system controller, in communication with a plurality of onboard sensors, and adapted to receive, from the plurality of onboard sensors, data related to the environment surrounding the vehicle and objects within the environment surrounding the vehicle, and identify current situational characteristics of the vehicle that require explanation to third parties within the environment surrounding the vehicle, and an external display in communication with the system controller, the system controller further adapted to display, via the external display, an explanation message related to the current situational characteristics of the vehicle for third parties within the environment surrounding the vehicle.

According to another aspect, the system further includes a human machine interface (HMI), wherein when identifying current situational characteristics of the vehicle that require explanation to third parties within the environment surrounding the vehicle, the system controller is further adapted to receive, via the HMI, a manually created explanation message from an occupant of the vehicle.

According to another aspect, the system further includes a computer vision algorithm within the system controller and a machine learning algorithm in communication with the system controller, wherein, when identifying current situational characteristics of the vehicle that require explanation to third parties within the environment surrounding the vehicle, the system controller is further adapted to identify, with the computer vision algorithm, actions taken by third parties within the environment surrounding the vehicle, and determine, with the machine learning algorithm, that identified actions taken by third parties within the environment surrounding the vehicle indicate that current situational characteristics of the vehicle require explanation to such third parties within the environment surrounding the vehicle.

According to another aspect, the system further includes a computer vision algorithm within the system controller and a machine learning algorithm in communication with the system controller, wherein, when identifying current situational characteristics of the vehicle that require explanation to third parties within the environment surrounding the vehicle, the system controller is further adapted to identify, with the computer vision algorithm, a location and activity of the vehicle, and determine, with the machine learning algorithm, that the location and activity of the vehicle require explanation to third parties within the environment surrounding the vehicle.

According to another aspect, the system further includes at least one physiological sensor associated with an occupant within the vehicle and in communication with the system controller, wherein, when identifying current situational characteristics of the vehicle that require explanation to third parties within the environment surrounding the vehicle, the system controller is further adapted to receive, from the at least one physiological sensor associated with an occupant within the vehicle, data related to a medical condition of the occupant, and identify a medical emergency situation.

According to another aspect, the system further includes a computer vision algorithm within the system controller and a machine learning algorithm in communication with the system controller and a database adapted to store data of past occurrences, wherein, when identifying current situational characteristics of the vehicle that require explanation to third parties within the environment surrounding the vehicle further, the system controller is further adapted to analyze real-time data collected by the plurality of onboard sensors with the computer vision algorithm, calculate, with the machine learning algorithm, using data of past occurrences, a probability that current situational characteristics of the vehicle require explanation to third parties within the environment surrounding the vehicle, and determine that an explanation is required when the calculated probability exceeds a pre-determined threshold.

According to another aspect, the system further includes a human machine interface (HMI), wherein, when displaying, with the external display, the explanation message related to the current situational characteristics of the vehicle for third parties within the environment surrounding the vehicle, the system controller is further adapted to one of automatically display, with the external display, the explanation message, or prompt, via the HMI, an occupant of the vehicle with the explanation message and display, with the external display, the explanation message upon receiving confirmation from the occupant of the vehicle via the HMI.

According to another aspect, after identifying current situational characteristics of the vehicle that require explanation to third parties within the environment surrounding the vehicle, the system controller is further adapted to determine, with the machine learning algorithm and a graphical image generator, content of the explanation message.

According to another aspect, when determining, with the machine learning algorithm and the graphical image generator, content of the explanation message, the system controller is further adapted to calculate, with the machine learning algorithm, an estimated time that current situational characteristics of the vehicle will continue, and include the estimated time within the explanation message.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
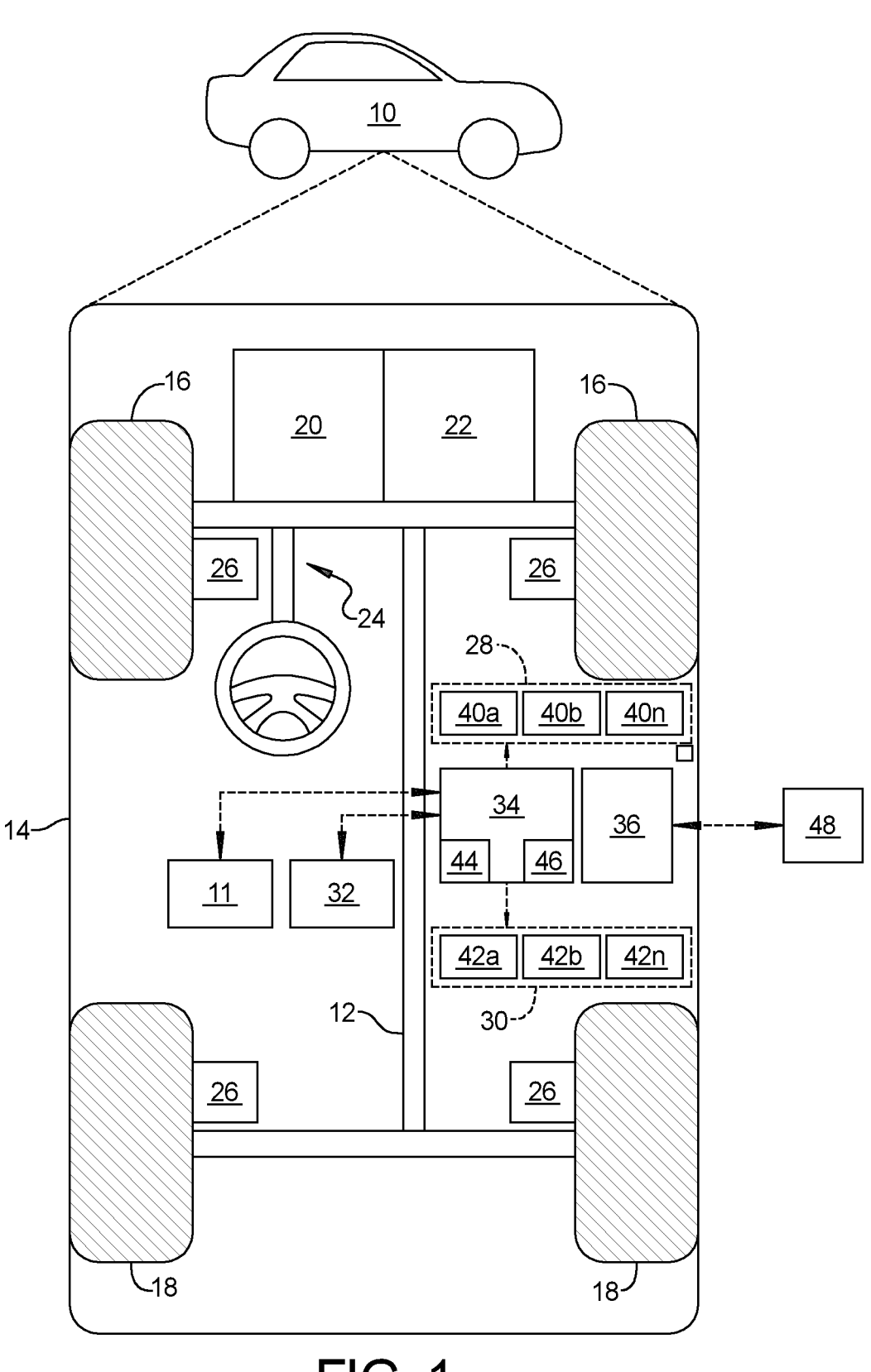
FIG. 1 is a schematic diagram of a vehicle having a system for providing a warning to an occupant of a hazardous object prior to the occupant exiting the vehicle according to an exemplary embodiment.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

In accordance with an exemplary embodiment, FIG. 1 shows a vehicle 10 with an associated system 11 for providing an explanation message on an external display of a vehicle 10 in accordance with various embodiments. In general, the system 11 works in conjunction with other systems within the vehicle 10 to display an explanation message providing information to third parties outside the vehicle informing such third parties of current situational characteristics of the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. The novel aspects of the present disclosure are also applicable to non-autonomous vehicles.

As shown, the vehicle 10 generally includes a propulsion system 20, a transmission system 22, a steering system 24, a brake system 26, a sensor system 28, an actuator system 30, at least one data storage device 32, a vehicle controller 34, and a wireless communication module 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image or map. The plurality of sensing devices 40a-40n is used to determine information about an environment surrounding the vehicle 10. In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40a-40n is capable of measuring distances in the environment surrounding the vehicle 10.

In a non-limiting example wherein the plurality of sensing devices 40a-40n includes a camera, the plurality of sensing devices 40a-40n measures distances using an image processing algorithm configured to process images from the camera and determine distances between objects. In another non-limiting example, the plurality of vehicle sensors 40a-40n includes a stereoscopic camera having distance measurement capabilities. In one example, at least one of the plurality of sensing devices 40a-40n is affixed inside of the vehicle 10, for example, in a headliner of the vehicle 10, having a view through the windshield of the vehicle 10. In another example, at least one of the plurality of sensing devices 40a-40n is a camera affixed outside of the vehicle 10, for example, on a roof of the vehicle 10, having a view of the environment surrounding the vehicle 10 and adapted to collect information (images) related to the environment outside the vehicle 10. It should be understood that various additional types of sensing devices, such as, for example, LiDAR sensors, ultrasonic ranging sensors, radar sensors, and/or time-of-flight sensors are within the scope of the present disclosure. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The wireless communication module 36 is configured to wirelessly communicate information to and from other remote entities 48, such as but not limited to, other vehicles ("V2V" communication,) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figures 2, 3:
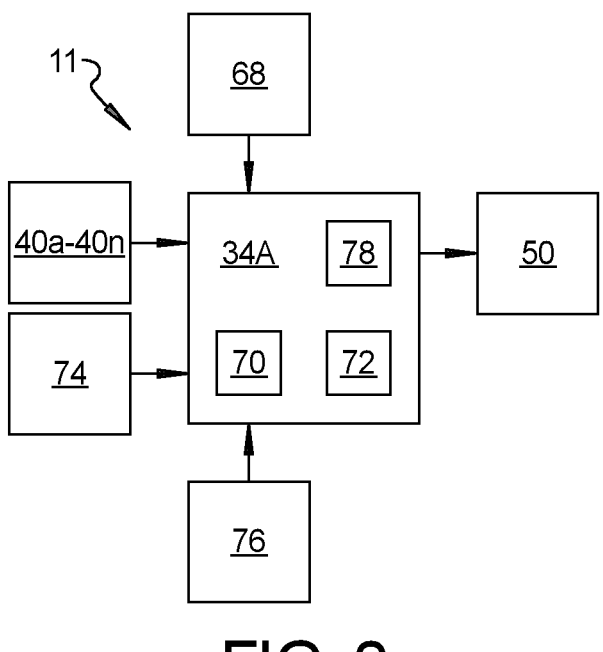
FIG. 2 is a schematic diagram of the system according to an exemplary embodiment.
FIG. 3 is a schematic diagram of a vehicle that is traveling slowly due to presence of a slow moving vehicle in front.

Referring to FIG. 2 a schematic diagram of the system 11 is shown. The system 11 includes a system controller 34A in communication with the plurality of sensing devices (onboard sensors) 40a-40n. The system controller 34A may be the vehicle controller 34, or the system controller 34A may be a separate controller in communication with the vehicle controller 34. In addition to the plurality of onboard sensors 40a-40n, the system controller 34A is in communication with an external display 50.

In an exemplary embodiment, the plurality of onboard sensors 40a-40n is adapted to collect data related to an environment surrounding the vehicle 10 and objects within the environment surrounding the vehicle 10. The plurality of onboard sensors 40a-40n detects objects near the vehicle 10 and third-party entities such as other vehicles and people. The data collected by the plurality of onboard sensors 40a-40n is received by the system controller 34A, wherein the system controller 34A is adapted to identify current situational characteristics of the vehicle 10 that require explanation to third parties within the environment surrounding the vehicle 10, and to display, via the external display 50, an explanation message 52 related to the current situational characteristics of the vehicle 10 for third parties within the environment surrounding the vehicle 10.

Situational characteristics that require explanation to third parties within the environment surrounding the vehicle 10 include situations where the vehicle 10 is located at a position or is operating in a manner that may be out of the ordinary, or may be creating an obstacle for a third party entity in the environment surrounding the vehicle 10. Such situation characteristics are a cue for the system controller 34A that an explanation message 52 is required. For example, referring to FIG. 3, the situational characteristics of the vehicle 10 are that the vehicle 10 is moving slower than the posted speed limit because the vehicle 10 is following a farm tractor 54 that is moving slowly. A third-party vehicle 56 is traveling behind the vehicle 10, thus, it may be helpful to provide an explanation message 52 for the third-party vehicle 56 to let the third-party vehicle 56 know why the vehicle 10 is traveling below the posted speed limit. As shown in FIG. 3, the external display 50 displays an explanation message 52 "Slow Moving Vehicle Ahead" to provide information to the third-party vehicle 56 explaining why the vehicle 10 is moving below the posted speed limit.

Figure 4:
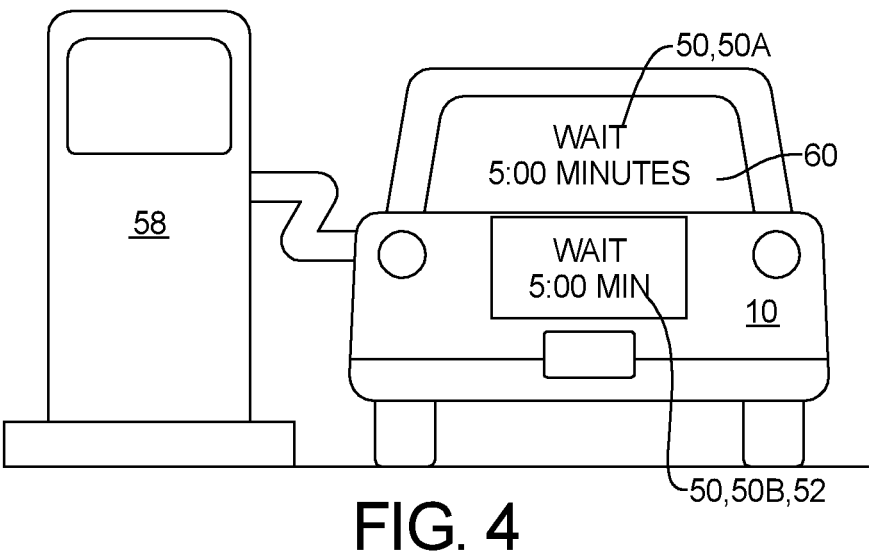
FIG. 4 is a schematic image of a vehicle that is parked at a gas pump.

Referring to FIG. 4, the vehicle 10 is parked at a gas pump 58. The situational characteristics of the vehicle 10 are that the vehicle 10 is parked at the gas pump 58, blocking other vehicles from using the gas pump 58. The external display 50A, 50B displays an explanation message 52 "Wait 5:00 minutes" to provide an estimated time to third-party vehicles of how long such third-party vehicles will need to wait to use the gas pump 58.

The external display 50, 50A, 50B may be any type of display suitable for displaying an external message. In an exemplary embodiment, the external display 50 shown in FIG. 3 and the external display 50A shown in FIG. 4 is an internal/external display system adapted to illuminate the explanation message 52 within a window surface 60 of the vehicle 10. The internal/external display system may use any suitable transparent display technology to display information onto the window surface 60 of the vehicle 10 to be viewed by third-party entities outside the vehicle 10. In an exemplary embodiment, the internal/external display system of the display 50, 50A uses excitation light projected onto the window surface 60 to illuminate transparent phosphors embedded within a substrate on the window surface 60. The transparent phosphors are light emitting particles which fluoresce in response to being excited by the excitation light. This type of internal/external display system is discussed in greater detail in U.S. application Ser. No. 17/749,464 titled "HYBRID AUGMENTED REALITY HEAD-UP DISPLAY FOR CREATING AN EDGE-TO-EDGE AUGMENTED REALITY VIEW" filed on May 20, 2022, the entire contents of which is hereby incorporated by reference.

In another exemplary embodiment, the external display 50B shown in FIG. 4 is any suitable known display screen mounted onto or within an exterior surface 62 of the vehicle 10. It should be understood by those skilled in the art that the external display 50 may be of any known technology suitable for providing an external message from the vehicle 10.

Figure 5:
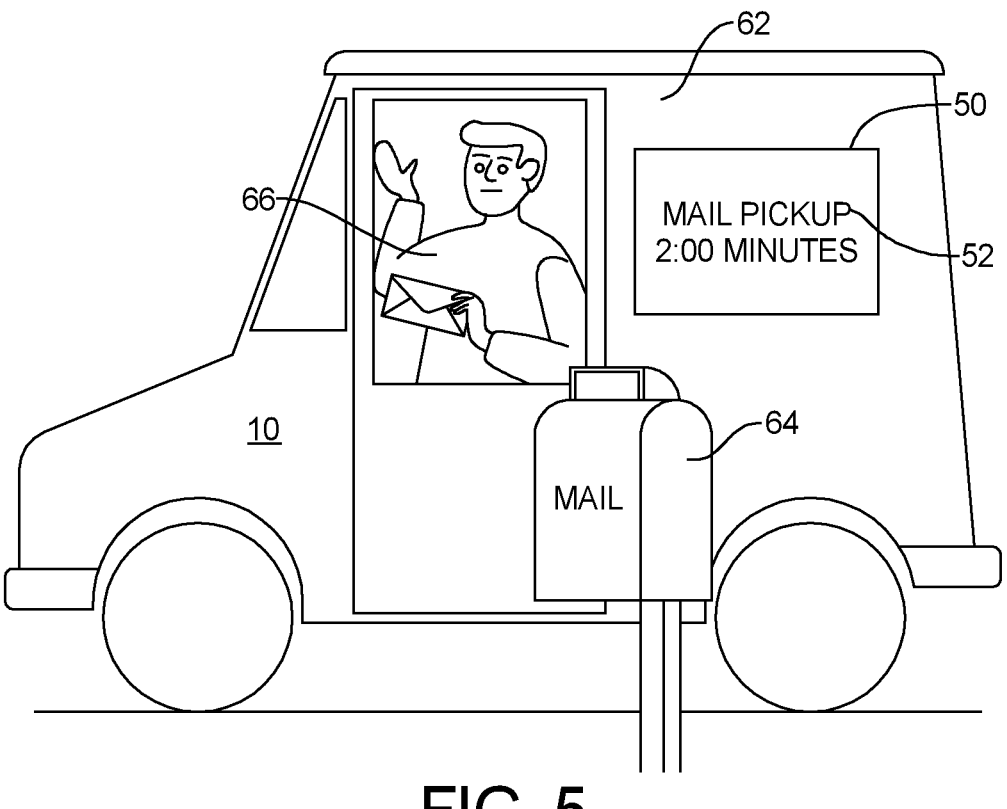
FIG. 5 is a schematic image of a vehicle parked at a city mailbox.

Referring to FIG. 5, the vehicle 10 is a mail truck that is parked in front of a city mailbox 64, wherein the mail carrier 66, will disembark from the vehicle 10 to pick up mail that has been deposited in the city mailbox 64. The situation characteristics of the vehicle 10 are that the vehicle 10 is parked in front of the city mailbox 64, possibly impeding the flow of traffic along the street. The external display 50 provides an explanation message 52 "Mail Pickup 2:00 Minutes" to provide information to third-party vehicles explaining why the vehicle 10 is parked at that location, and an estimated time that the vehicle 10 will be parked there. This will allow a third-party vehicle to understand the reason for the vehicle 10 being parked at that location and give the third-party vehicle information on how long the vehicle 10 will be parked at that location, allowing a third-party vehicle to either choose to wait patiently, or decide to maneuver around the vehicle 10. As shown in FIG. 5, the external display 50 may be positioned on a side of the vehicle 10, or referring to FIG. 6, the external display 50 may be positioned on the rear of the vehicle 10. The external display 50 may use any window surface 60 of the vehicle 10, or may be mounted within or onto any exterior surface of the vehicle 10.

Figures 6, 7:
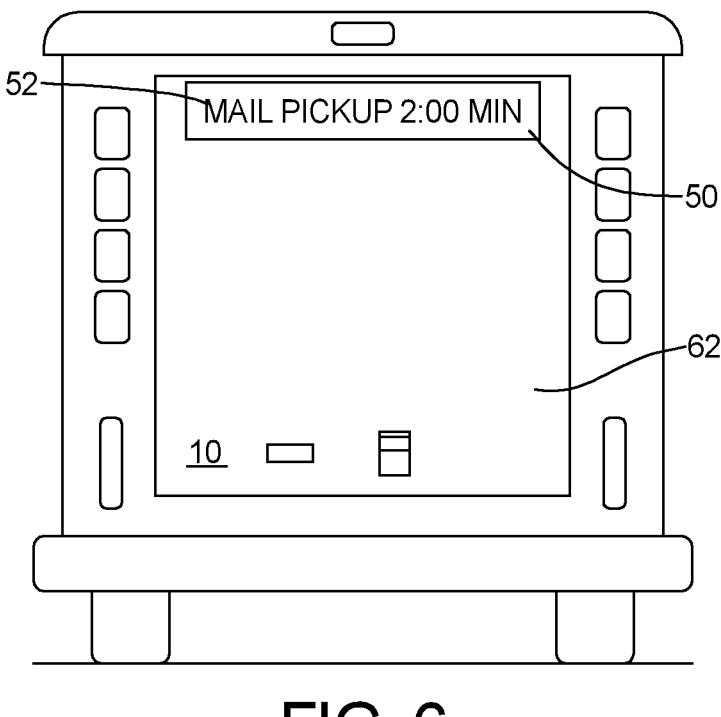
FIG. 6 is a schematic rear view of the vehicle shown in FIG. 5.
FIG. 7 is a schematic image of a vehicle parked on the side of a highway displaying an explanation message that the vehicle has a flat tire.

Referring to FIG. 7, the vehicle 10 is located within a lane of a highway because the vehicle 10 has a flat tire. The situation characteristics of the vehicle 10 are that the vehicle 10 is potentially partially or entirely blocking traffic within that lane of the highway. The external display 50 provides an explanation message 52 "FLAT TIRE" to provide information to third-party vehicles explaining why the vehicle 10 is parked at that location.

In an exemplary embodiment, the system 11 further includes a human machine interface (HMI) 68, wherein when identifying current situational characteristics of the vehicle 10 that require explanation to third parties within the environment surrounding the vehicle 10, the system controller 34A is further adapted to receive, via the HMI 68, a manually created explanation message 52 from an occupant of the vehicle 10. For example, referring again to FIG. 5, when the mail carrier 66 parks the vehicle 10 (mail truck) in front of the city mailbox 64, the mail carrier 66 knows that it will take two minutes to disembark from the vehicle 10, collect mail from the city mailbox 64, return to the vehicle 10 and proceed. Thus, the mail carrier 66, using the HMI, manually enters the explanation message 52 "Mail Pickup 2:00 Minutes" and instructs the system 11 to display the explanation message 52 onto the external display 50.

Figure 8:
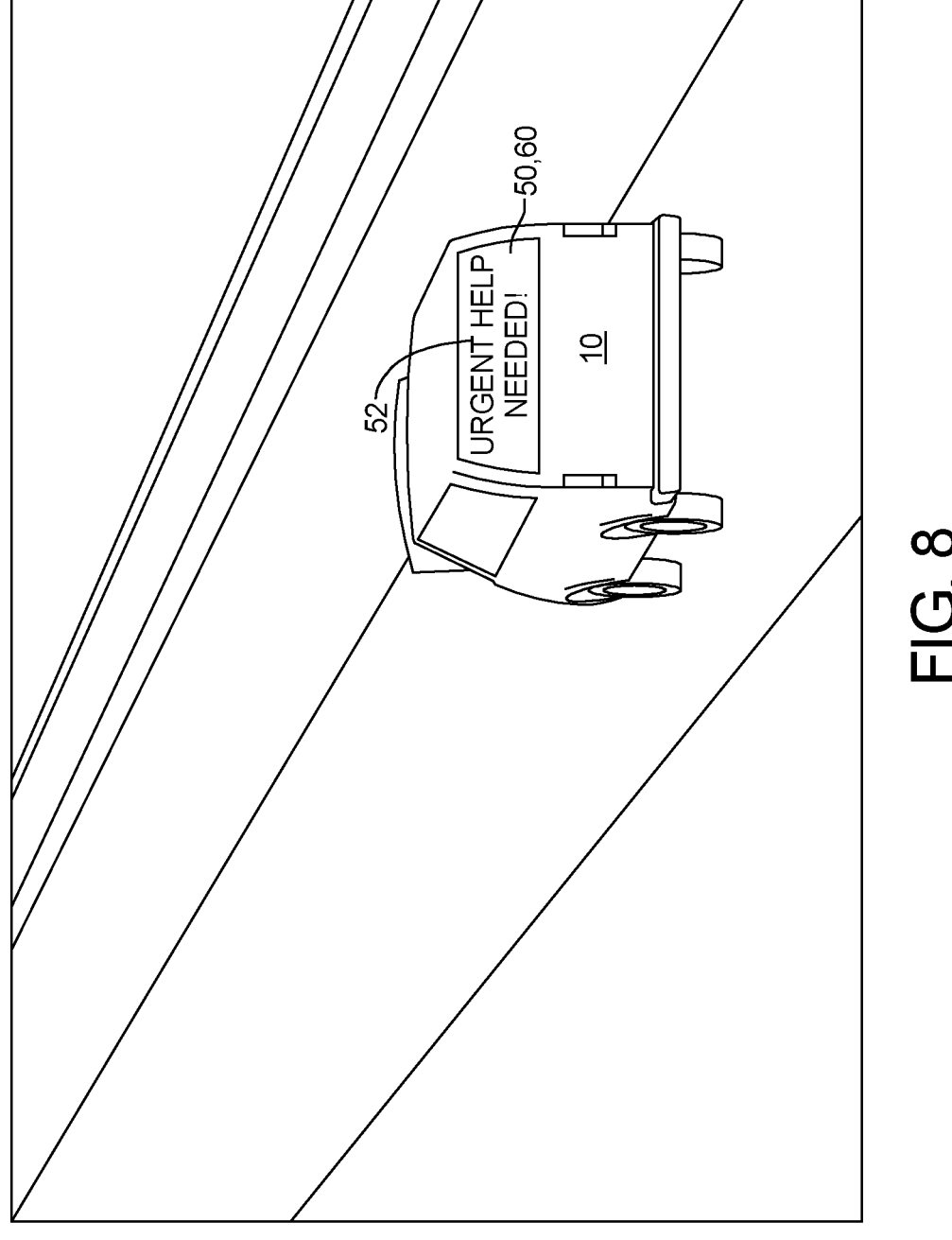
FIG. 8 is a schematic image of a vehicle parked on the side of a highway displaying an explanation message requesting urgent help.

Similarly, referring again to FIG. 7, a driver of the vehicle 10 uses the HMI 68 to manually enter the explanation message 52 "FLAT TIRE". In this way, when a vehicle is disabled along a roadway, an occupant within the vehicle 10 can manually enter an explanation message to provide whatever information they desire to third-party vehicles. Referring to FIG. 8, an occupant of the vehicle 10, using the HMI 68, manually enters the explanation message 52 "URGENT HELP NEEDED" to inform third-party vehicles that assistance is needed due to a medical or other emergency situation.

In another exemplary embodiment, the system 11 further includes a computer vision algorithm 70 within the system controller 34A and a machine learning algorithm 72 in communication with the system controller 34A, wherein, when identifying current situational characteristics of the vehicle 10 that require explanation to third parties within the environment surrounding the vehicle 10, the system controller 34A is further adapted to identify, with the computer vision algorithm 70, actions taken by third parties within the environment surrounding the vehicle 10, and determine, with the machine learning algorithm 72, that identified actions taken by third parties within the environment surrounding the vehicle 10 indicate that current situational characteristics of the vehicle 10 require explanation to such third parties within the environment surrounding the vehicle 10.

Referring again to FIG. 3, the system controller 34A identifies situational characteristics, such as the vehicle 10 is traveling slower than the posted speed limit, that may indicate an explanation message 52 is required. In addition, the system controller 34A, using the computer vision algorithm 70 and image recognition techniques applied to images of the environment outside the vehicle 10 captured by a camera (at least one of the plurality of onboard sensors 40a-40n), identifies the third-party vehicle 56 tailgating the vehicle 10. The system controller 34A, using the machine learning algorithm 72, recognizes tailgating by the third-party vehicle 56, particularly in combination with data that the vehicle 10 is moving slower than the posted speed limit, as an indication that an explanation message 52 may be required. Thus, the system controller 34A, using the computer vision algorithm 70 and the machine learning algorithm 72 identifies actions taken by a third-party entity, such as tailgating by the third-party vehicle 56, as a query from the third-party requesting an explanation message 52, and automatically generates and displays the explanation message 52. Such actions may include, but are not limited to, tailgating by a following third-party vehicle, aggressive driving (swerving, speeding up/slowing down) by a third-party vehicle, horn blowing by a third-party vehicle, gestures or audible expressions made by an occupant of a third-party vehicle or a bystander, etc. In an exemplary embodiment, the system controller 34A automatically generates an explanation message 52, prompts, via the HMI 68, an occupant of the vehicle 10 with the explanation message 52 and displays, with the external display 50, the explanation message 52 upon receiving confirmation from the occupant of the vehicle 10 via the HMI 68.

In another exemplary embodiment, the system 11 uses the computer vision algorithm 70 within the system controller 34A and the machine learning algorithm 72 in communication with the system controller 34A, to identify, with the computer vision algorithm 70, a location and activity of the vehicle 10, and to determine, with the machine learning algorithm 72, that the location and activity of the vehicle 10 require explanation to third parties within the environment surrounding the vehicle 10.

Referring again to FIG. 5, the system controller 34A identifies situational characteristics, such as the vehicle 10 is parked along the street, that may indicate an explanation message 52 is required. In addition, the system controller 34A, using the computer vision algorithm 70 and image recognition techniques applied to images of the environment outside the vehicle 10, identifies the object within the environment surrounding the vehicle 10, such as the city mailbox 64, street signs, building, or other landmarks. The system controller 34A, using the machine learning algorithm 72, recognizes the city mailbox 64 and other objects and determines, along with data that the vehicle is stopped, as an indication that an explanation message 52 may be required. Based on past occurrences stored within a database 74 in communication with the system controller 34A, the machine learning algorithm 70 recognizes the location where the vehicle 10 is parked, and predicts the activity and estimates a time for the activity. Thus, the system controller 34A, using the computer vision algorithm 70 and the machine learning algorithm 72 identifies the location where the vehicle 10 is parked and predicts the activity and timing, and automatically generates and displays the explanation message 52. In an exemplary embodiment, the system controller 34A automatically generates an explanation message 52, prompts, via the HMI 68, an occupant of the vehicle 10 with the explanation message 52 and displays, with the external display 50, the explanation message 52 upon receiving confirmation from the occupant of the vehicle 10 via the HMI 68.

In another exemplary embodiment, the system 11 includes at least one physiological sensor 76 associated with an occupant within the vehicle 10 and in communication with the system controller 34A, wherein, when identifying current situational characteristics of the vehicle 10 that require explanation to third parties within the environment surrounding the vehicle 10, the system controller 34A is further adapted to receive, from the at least one physiological sensor 76, data related to a medical condition of the occupant, and identify a medical emergency situation.

The at least one physiological sensor 76 monitors physiological signals, such as brain waves and heart rate, pulse rate, and respiration rate signals. While electroencephalography (EEG) which monitors brain waves provides the best physiological signal to evaluate a occupant's attention status, such data is difficult to obtain while driving. Another biological signal is an electrocardiogram (ECG) signal with heart rate and heart rate variability information. Other methods of collecting physiological data include collecting biological signals such as respiration (via sensors positioned within a seat and/or safety belt), gripping force and photoplethysmogram (PPG) (via sensors on the steering wheel), and muscle current (electromyography (EMG)). Such biological signals can also be received from wearable devices, such as a smartwatch, that are worn by the occupant. Various techniques are employed to extract meaningful features from the physiological sensor 76 readings, including time-series analysis, frequency-domain analysis, and spatial-temporal patterns. The machine learning algorithm 72 is used to classify a possible medical emergency for an occupant. Thus, as shown in FIG. 8, the system controller 34A, using data from the plurality of onboard sensors 40a-40n, identifies that the vehicle is stopped within or adjacent to a lane of a highway, and, using the computer vision algorithm 70 and the machine learning algorithm 72 along with machine learning techniques, identifies physiological signals from the at least one physiological sensor 76 that indicate a medical emergency, wherein, the system controller determines that the vehicle 10 is stopped because the driver is having a medical emergency and automatically generates and displays an explanation message, such as shown in FIG. 8.

In an exemplary embodiment, the system controller 34A, using the computer vision algorithm 70 and the machine learning algorithm 72 and data related to past occurrences stored within the database 76, analyzes real-time data collected by the plurality of onboard sensors 40a-40n with the computer vision algorithm 70, calculates, with the machine learning algorithm 72, using data of past occurrences from the database 74, a probability that current situational characteristics of the vehicle 10 require explanation to third parties within the environment surrounding the vehicle 10, and determines that an explanation message 52 is required when the calculated probability exceeds a pre-determined threshold.

The database 74 in communication with the system controller 34A is adapted to store data related to past occurrences where an explanation message was manually or automatically generated and displayed, as well as environmental aspects (weather, temperature, precipitation), actions by third-party entities (tailgating, aggressive driving, gestures by occupant of vehicle or bystander) and vehicle aspects (location, parked, stopped, engine off) during such past occurrences.

The machine learning algorithm 72 is adapted to predict a probability that the current situational characteristics require an explanation message 52 based on real-time data collected by the plurality of onboard sensors 40a-40n, analysis of captured images using the computer vision algorithm 70 and image recognition techniques and data from past occurrences from the database 74.

Various techniques are employed to extract meaningful features from sensor readings and data, including time-series analysis, frequency-domain analysis, and spatial-temporal patterns. The machine learning algorithm 72 may be one of, but not limited to, Long Short-Term Memory (LSTM), Gated Recurrent Unit (GRU), Decision Trees, Random Forests, Support Vector Machines (SVM), Neural Networks (NN), K-Nearest Neighbors (KNN), Gradient Boosting and Recurrent Neural Networks (RNN). The machine learning algorithm 72 is trained with data collected from a plurality of different vehicles. A diverse dataset is collected from vehicles equipped with sensors such as GPS, accelerometers, cameras, radar, and LIDAR. The data encompasses various driving scenarios, including urban, highway, and off-road driving. Before feeding the data into machine learning models, preprocessing steps are undertaken to remove noise, handle missing values, and standardize features. An essential step in driving behavior classification is the extraction of relevant features from the raw data. As mentioned above, various techniques are employed to extract meaningful features from sensor readings, including time-series analysis, frequency-domain analysis, and spatial-temporal patterns. Different types of machine learning algorithms may be used for probabilistic identification of hazardous objects. The machine learning algorithm 72 is trained on a labeled dataset and evaluated using various performance metrics such as accuracy, precision, recall, F1-score, and confusion matrix. The hyperparameters of the models are tuned to achieve optimal results. The machine learning algorithm 72 is further trained on training data and will learn to map input features to the corresponding probabilities.

Data from occurrences of the system controller 34A generating an explanation message 52 (automatically or in response to manual prompting via the HMI 68) is saved to the database 74 and is used to continuously update the machine learning algorithm 72. Thus, the system controller 34A uses the machine learning algorithm 72 and machine learning techniques to predict a probability that an explanation message 52 is required based on analyzing the real-time data collected by the plurality of onboard sensors 40a-40n, analysis of captured images using the computer vision algorithm 70 and image recognition techniques and data from past occurrences from the database 74.

For example, referring again to FIG. 5, when the vehicle 10 (mail truck) parks in front of the city mailbox 64, the system controller 34A, using the computer vision algorithm and images collected from the plurality of onboard sensors 40a-40n identifies the location (parked in front of the city mailbox 64) and activity (picking up mail) of the vehicle 10. The system controller 34A, using the machine learning algorithm 72, will determine if an explanation message is needed. For example, based on data from the database 74, the machine learning algorithm 72 identifies that during peak traffic times, between 3:00 pm and 5:00 pm, an explanation message is generally required when the vehicle 10 stops to pick up mail at this location. However, based on data from the database 74, an explanation message is generally not required if the vehicle 10 stops at this location during other times. Thus, if the vehicle 10 stops at the city mailbox 64 outside of peak traffic times, the system controller 34A does not automatically generate an explanation message 52. If the probabilistic analysis of real time date indicates borderline requirement of an explanation message 52, the system controller 34A may prompt the mail carrier 66 via the HMI 68 and let the mail carrier 66 decide if they want to display an explanation message 52 or not.

In another example, referring again to FIG. 5, when the vehicle 10 (mail truck) parks in front of the city mailbox 64, the system controller 34A, using the computer vision algorithm and images collected from the plurality of onboard sensors 40a-40n identifies the location (parked in front of the city mailbox 64) and activity (picking up mail) of the vehicle 10. The system controller 34A, using the machine learning algorithm 72, will determine if an explanation message 52 is needed and the content of the explanation message 52. For example, based on data from the database 74, the machine learning algorithm 72 identifies that when the vehicle 10 stops at this city mailbox 64 on Mondays, it takes the mail carrier 66, on average, 5:00 minutes to disembark, pick up the mail, and resume the route. This is because on Mondays, mail has piled up within the city mailbox 64 over the weekend, when the mail does not run. However, the remaining days of the week, Tuesday through Friday, when the vehicle 10 stops at this city mailbox 64, it takes the mail carrier 66, on average, less than 2:00 minutes to disembark, pick up the mail, and resume the route. Thus, if the vehicle 10 stops at the city mailbox 64 on Monday, during peak traffic times, an explanation message will automatically be generated including an estimated time of 5:00 minutes. On any other day, the explanation message 52 displayed when the vehicle 10 is parked at the city mailbox 64 will include an estimated time of 2:00 minutes. The estimated time could be affected by other factors, such as the season, wherein, data from the database 74 indicates that during the winter, it takes the mail carrier 66 longer to collect the mail from the city mailbox 64. Thus, if the plurality of sensors 40a-40n detect freezing temperatures or the presence of snow on the ground, the machine learning algorithm 72 will adjust the estimated time accordingly.

In an exemplary embodiment, after identifying current situational characteristics of the vehicle 10 that require explanation to third parties within the environment surrounding the vehicle 10, the system controller 34A is further adapted to determine, with the machine learning algorithm 72 and a graphical image generator 78, content of the explanation message 52. The graphical image generator 78 processes information from the system controller 34A and the machine learning algorithm 72 and determines an appropriate explanation message 52 to display.

Figure 9:
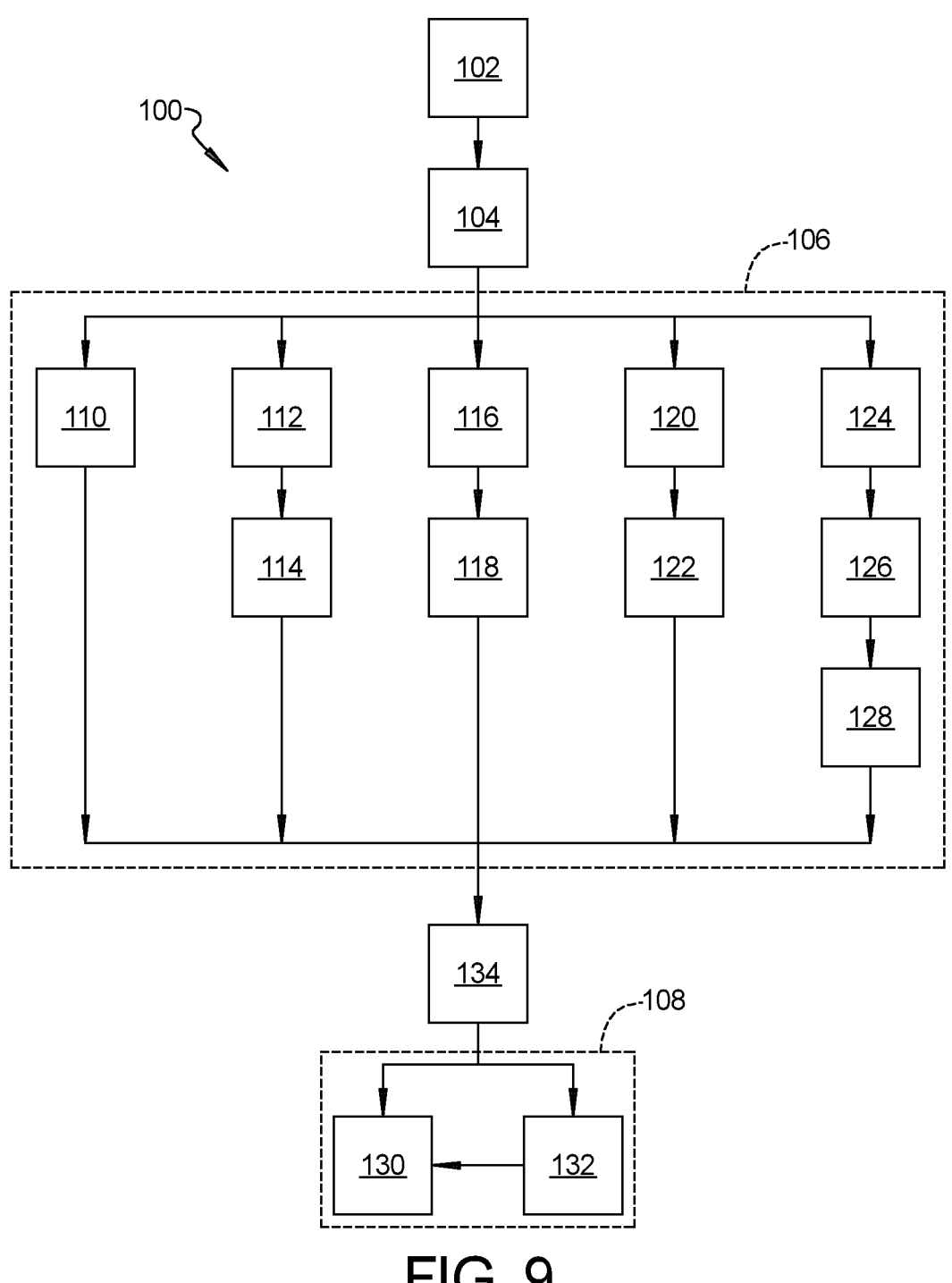
FIG. 9 is a flow chart illustrating a method according to an exemplary embodiment.

Referring to FIG. 9, a method 100 of providing a message on an external display 50 of a vehicle 10 includes, beginning at block 102, collecting, with a plurality of onboard sensors 40a-40n, data related to an environment surrounding the vehicle 10 and objects within the environment surrounding the vehicle 10, moving to block 104, receiving, with a system controller 34A in communication with the plurality of onboard sensors 40a-40n, data related to the environment surrounding the vehicle 10 and objects within the environment surrounding the vehicle 10, moving to block 106, identifying, with the system controller 34A, current situational characteristics of the vehicle 10 that require explanation to third parties within the environment surrounding the vehicle 10, and, moving to block 108, displaying, with an external display 50, an explanation message 52 related to the current situational characteristics of the vehicle 10 for third parties within the environment surrounding the vehicle 10.

In an exemplary embodiment, the identifying, with the system controller 34A, current situational characteristics of the vehicle 10 that require explanation to third parties within the environment surrounding the vehicle 10 at block 106, further includes, moving from block 104 to block 110, receiving, via a human machine interface (HMI) 68, a manually created explanation message 52 from an occupant of the vehicle 10.

In an exemplary embodiment, the identifying, with the system controller 34A, current situational characteristics of the vehicle 10 that require explanation to third parties within the environment surrounding the vehicle 10 at block 106, further includes, moving from block 104 to block 112, identifying, with a computer vision algorithm 70, actions taken by third parties within the environment surrounding the vehicle 10, and, moving to block 114, determining, with a machine learning algorithm 72, that identified actions taken by third parties within the environment surrounding the vehicle 10 indicate that current situational characteristics of the vehicle 10 require explanation to such third parties within the environment surrounding the vehicle 10.

In an exemplary embodiment, the identifying, with the system controller 34A, current situational characteristics of the vehicle 10 that require explanation to third parties within the environment surrounding the vehicle 10 at block 106, further includes, moving from block 104 to block 116, identifying, with a computer vision algorithm 70, a location and activity of the vehicle 10, and, moving to block 118, determining, with a machine learning algorithm 72, that the location and activity of the vehicle require explanation to third parties within the environment surrounding the vehicle 10.

In an exemplary embodiment, the identifying, with the system controller 34A, current situational characteristics of the vehicle 10 that require explanation to third parties within the environment surrounding the vehicle 10 at block 106, further includes, moving from block 104 to block 120, receiving, with the system controller 34A in communication with at least one physiological sensor 76 associated with an occupant within the vehicle 10, data related to a medical condition of the occupant, and, moving to block 122, identifying, with the system controller 34A, a medical emergency situation.

In an exemplary embodiment, the identifying, with the system controller 34A, current situational characteristics of the vehicle 10 that require explanation to third parties within the environment surrounding the vehicle 10 at block 106, further includes, moving from block 104 to block 124, analyzing real-time data collected by the plurality of onboard sensors 40a-40n with a computer vision algorithm 70 and a machine learning algorithm 72 within the system controller 34A and in communication with a database 74 adapted to store data of past occurrences, moving to block 126, calculating, with the machine learning algorithm 72, a probability that current situational characteristics of the vehicle 10 require explanation to third parties within the environment surrounding the vehicle 10, and, moving to block 128, determining that an explanation is required when the calculated probability exceeds a pre-determined threshold.

In an exemplary embodiment, the displaying, with an external display 50, an explanation message 52 related to the current situational characteristics of the vehicle 10 for third parties within the environment surrounding the vehicle 10 at block 108 further includes one of, moving from block 106 to block 130, automatically displaying, with the external display 50, the explanation message 52, or, moving from block 106 to block 132, prompting, via a human machine interface (HMI) 68, an occupant of the vehicle 10 with the explanation message 52 and, moving from block 132 to block 130, displaying, with the external display 50, the explanation message 52 upon receiving confirmation from the occupant of the vehicle 10 via the HMI 68 at block 132.

In an exemplary embodiment, the method 100 further includes, after identifying, with the system controller 34A, current situational characteristics of the vehicle 10 that require explanation to third parties within the environment surrounding the vehicle 10 at block 106, moving to block 134, determining, with the machine learning algorithm 72 and a graphical image generator 78, content of the explanation message 52.

In another exemplary embodiment, the determining, with the machine learning algorithm 72 and the graphical image generator 78, content of the explanation message 52 at block 134, further includes calculating, with the machine learning algorithm 72, an estimated time that current situational characteristics of the vehicle 10 will continue and including the estimated time within the explanation message 52.

A system and method of the present disclosure offers the advantage of providing an explanation message to a third-party when situational circumstances of a vehicle dictate that an explanation message is required.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of providing a message on an external display of a vehicle, comprising:

collecting, with a plurality of onboard sensors, data related to an environment surrounding the vehicle and objects within the environment surrounding the vehicle;

receiving, with a system controller in communication with the plurality of onboard sensors, data related to the environment surrounding the vehicle and objects within the environment surrounding the vehicle;

identifying, with the system controller, current situational characteristics of the vehicle that require explanation to third parties within the environment surrounding the vehicle; and displaying, with an external display adapted to illuminate a message within a window surface of the vehicle by projecting an excitation light onto the window surface and illuminating transparent phosphors embedded within a substrate on the window surface, an explanation message related to the current situational characteristics of the vehicle for third parties within the environment surrounding the vehicle, the explanation message configured to:

provide a description of the current situational characteristics of the vehicle; and provide an explanation of why the current situational characteristics are occurring.

2. The method of claim 1, wherein the identifying, with the system controller, current situational characteristics of the vehicle that require explanation to third parties within the environment surrounding the vehicle further includes receiving, via a human machine interface (HMI), a manually created explanation message from an occupant of the vehicle.

3. The method of claim 1, wherein the identifying, with the system controller, current situational characteristics of the vehicle that require explanation to third parties within the environment surrounding the vehicle further includes:

identifying, with a computer vision algorithm, actions taken by third parties within the environment surrounding the vehicle; and determining, with a machine learning algorithm, that identified actions taken by third parties within the environment surrounding the vehicle indicate that current situational characteristics of the vehicle require explanation to such third parties within the environment surrounding the vehicle.

4. The method of claim 1, wherein the identifying, with the system controller, current situational characteristics of the vehicle that require explanation to third parties within the environment surrounding the vehicle further includes:

identifying, with a computer vision algorithm, a location and activity of the vehicle; and determining, with the machine learning algorithm, that the location and activity of the vehicle require explanation to third parties within the environment surrounding the vehicle.

5. The method of claim 1, wherein the identifying, with the system controller, current situational characteristics of the vehicle that require explanation to third parties within the environment surrounding the vehicle further includes:

receiving, with the system controller in communication with at least one physiological sensor associated with an occupant within the vehicle, data related to a medical condition of the occupant; and identifying, with the system controller, a medical emergency situation.

6. The method of claim 1, wherein the identifying, with the system controller, current situational characteristics of the vehicle that require explanation to third parties within the environment surrounding the vehicle further includes:

analyzing real-time data collected by the plurality of onboard sensors with a computer vision algorithm and a machine learning algorithm within the system controller and in communication with a database adapted to store data of past occurrences;

calculating, with the machine learning algorithm, a probability that current situational characteristics of the vehicle require explanation to third parties within the environment surrounding the vehicle; and determining that an explanation is required when the calculated probability exceeds a pre-determined threshold.

7. The method of claim 6, wherein the displaying, with an external display, an explanation message related to the current situational characteristics of the vehicle for third parties within the environment surrounding the vehicle further includes one of:

automatically displaying, with the external display, the explanation message; or prompting, via a human machine interface (HMI), an occupant of the vehicle with the explanation message and displaying, with the external display, the explanation message upon receiving confirmation from the occupant of the vehicle via the HMI.

8. The method of claim 7, further including, after identifying, with the system controller, current situational characteristics of the vehicle that require explanation to third parties within the environment surrounding the vehicle, determining, with the machine learning algorithm and a graphical image generator, content of the explanation message.

9. The method of claim 8, wherein the determining, with the machine learning algorithm and a graphical image generator, content of the explanation message further includes calculating, with the machine learning algorithm, an estimated time that current situational characteristics of the vehicle will continue and including the estimated time within the explanation message.

10. A system for providing a message on an external display of a vehicle, comprising:

a plurality of onboard sensors adapted to collect data related to an environment surrounding the vehicle and objects within the environment surrounding the vehicle;

a system controller, in communication with a plurality of onboard sensors, and adapted to:

receive, from the plurality of onboard sensors, data related to the environment surrounding the vehicle and objects within the environment surrounding the vehicle; and identify current situational characteristics of the vehicle that require explanation to third parties within the environment surrounding the vehicle; and an external display in communication with the system controller, the external display adapted to illuminate a message within a window surface of the vehicle by projecting an excitation light onto the window surface and illuminating transparent phosphors embedded within a substrate on the window surface, and the system controller further adapted to display, via the external display, an explanation message related to the current situational characteristics of the vehicle for third parties within the environment surrounding the vehicle, the explanation message configured to:

provide a description of the current situational characteristics of the vehicle; and provide an explanation of why the current situational characteristics are occurring.

11. The system of claim 10, further including a human machine interface (HMI), wherein when identifying current situational characteristics of the vehicle that require explanation to third parties within the environment surrounding the vehicle, the system controller is further adapted to receive, via the HMI, a manually created explanation message from an occupant of the vehicle.

12. The system of claim 10, further including a computer vision algorithm within the system controller and a machine learning algorithm in communication with the system controller, wherein, when identifying current situational characteristics of the vehicle that require explanation to third parties within the environment surrounding the vehicle, the system controller is further adapted to:

identify, with the computer vision algorithm, actions taken by third parties within the environment surrounding the vehicle; and determine, with the machine learning algorithm, that identified actions taken by third parties within the environment surrounding the vehicle indicate that current situational characteristics of the vehicle require explanation to such third parties within the environment surrounding the vehicle.

13. The system of claim 10, further including a computer vision algorithm within the system controller and a machine learning algorithm in communication with the system controller, wherein, when identifying current situational characteristics of the vehicle that require explanation to third parties within the environment surrounding the vehicle, the system controller is further adapted to:

identify, with the computer vision algorithm, a location and activity of the vehicle; and determine, with the machine learning algorithm, that the location and activity of the vehicle require explanation to third parties within the environment surrounding the vehicle.

14. The system of claim 10, further including at least one physiological sensor associated with an occupant within the vehicle and in communication with the system controller, wherein, when identifying current situational characteristics of the vehicle that require explanation to third parties within the environment surrounding the vehicle, the system controller is further adapted to:

receive, from the at least one physiological sensor associated with an occupant within the vehicle, data related to a medical condition of the occupant; and identify a medical emergency situation.

15. The system of claim 10, further including a computer vision algorithm within the system controller and a machine learning algorithm in communication with the system controller and a database adapted to store data of past occurrences, wherein, when identifying current situational characteristics of the vehicle that require explanation to third parties within the environment surrounding the vehicle further, the system controller is further adapted to:

analyze real-time data collected by the plurality of onboard sensors with the computer vision algorithm;

calculate, with the machine learning algorithm, using data of past occurrences, a probability that current situational characteristics of the vehicle require explanation to third parties within the environment surrounding the vehicle; and determine that an explanation is required when the calculated probability exceeds a pre-determined threshold.

16. The system of claim 15, further including a human machine interface (HMI), wherein, when displaying, with the external display, the explanation message related to the current situational characteristics of the vehicle for third parties within the environment surrounding the vehicle, the system controller is further adapted to one of:

automatically display, with the external display, the explanation message; or prompt, via the HMI, an occupant of the vehicle with the explanation message and display, with the external display, the explanation message upon receiving confirmation from the occupant of the vehicle via the HMI.

17. The system of claim 16, wherein, after identifying current situational characteristics of the vehicle that require explanation to third parties within the environment surrounding the vehicle, the system controller is further adapted to determine, with the machine learning algorithm and a graphical image generator, content of the explanation message.

18. The system of claim 17, wherein when determining, with the machine learning algorithm and the graphical image generator, content of the explanation message, the system controller is further adapted to:

calculate, with the machine learning algorithm, an estimated time that current situational characteristics of the vehicle will continue; and include the estimated time within the explanation message.

19. A vehicle including a system for providing a message on an external display of a vehicle, the system comprising:

a plurality of onboard sensors adapted to collect data related to an environment surrounding the vehicle and objects within the environment surrounding the vehicle;

a human machine interface (HMI) adapted to allow an occupant within the vehicle to interact with the system controller;

at least one physiological sensor associated with an occupant within the vehicle;

a computer vision algorithm;

a machine learning algorithm in communication with a database adapted to store data related to past occurrences;

a system controller, in communication with the plurality of onboard sensors, the HMI, the at least one physiological sensor, the computer vision algorithm and the machine learning algorithm and adapted to:

receive, from the plurality of onboard sensors, data related to the environment surrounding the vehicle and objects within the environment surrounding the vehicle; and identify current situational characteristics of the vehicle that require explanation to third parties within the environment surrounding the vehicle by at least one of:

receiving, via the HMI, a manually created explanation message from an occupant of the vehicle;

identifying, with the computer vision algorithm, actions taken by third parties within the environment surrounding the vehicle, and determining, with the machine learning algorithm, that identified actions taken by third parties within the environment surrounding the vehicle indicate that current situational characteristics of the vehicle require explanation to such third parties within the environment surrounding the vehicle;

identifying, with the computer vision algorithm, a location and activity of the vehicle, and determining, with the machine learning algorithm, that the location and activity of the vehicle require explanation to third parties within the environment surrounding the vehicle;

receiving, from the at least one physiological sensor, data related to a medical condition of the occupant, and identifying a medical emergency situation; and analyzing real-time data collected by the plurality of onboard sensors with the computer vision algorithm, calculating, with the machine learning algorithm, using data of past occurrences, a probability that current situational characteristics of the vehicle require explanation to third parties within the environment surrounding the vehicle, and determining that an explanation is required when the calculated probability exceeds a pre-determined threshold; and an external display in communication with the system controller, the external display adapted to illuminate a message within a window surface of the vehicle by projecting an excitation light onto the window surface and illuminating transparent phosphors embedded within a substrate on the window surface, and the system controller further adapted to one of:

automatically display, with the external display, an explanation message related to the current situational characteristics of the vehicle for third parties within the environment surrounding the vehicle; or prompt, via the HMI, an occupant of the vehicle with an explanation message and display, with the external display, the explanation message upon receiving confirmation from the occupant of the vehicle via the HMI;

wherein, the explanation message is configured to:

provide a description of the current situational characteristics of the vehicle; and provide an explanation of why the current situational characteristics are occurring.

20. The vehicle of claim 19, wherein, after identifying current situational characteristics of the vehicle that require explanation to third parties within the environment surrounding the vehicle, the system controller is further adapted to:

calculate, with the machine learning algorithm, an estimated time that current situational characteristics of the vehicle will continue; and determine, with the machine learning algorithm and a graphical image generator, content of the explanation message and including the estimated time within the explanation message.

* * * * *